June 19, 1962 R. E. KNITTEL 3,039,356
KALEIDOSCOPES
Filed Nov. 4, 1959
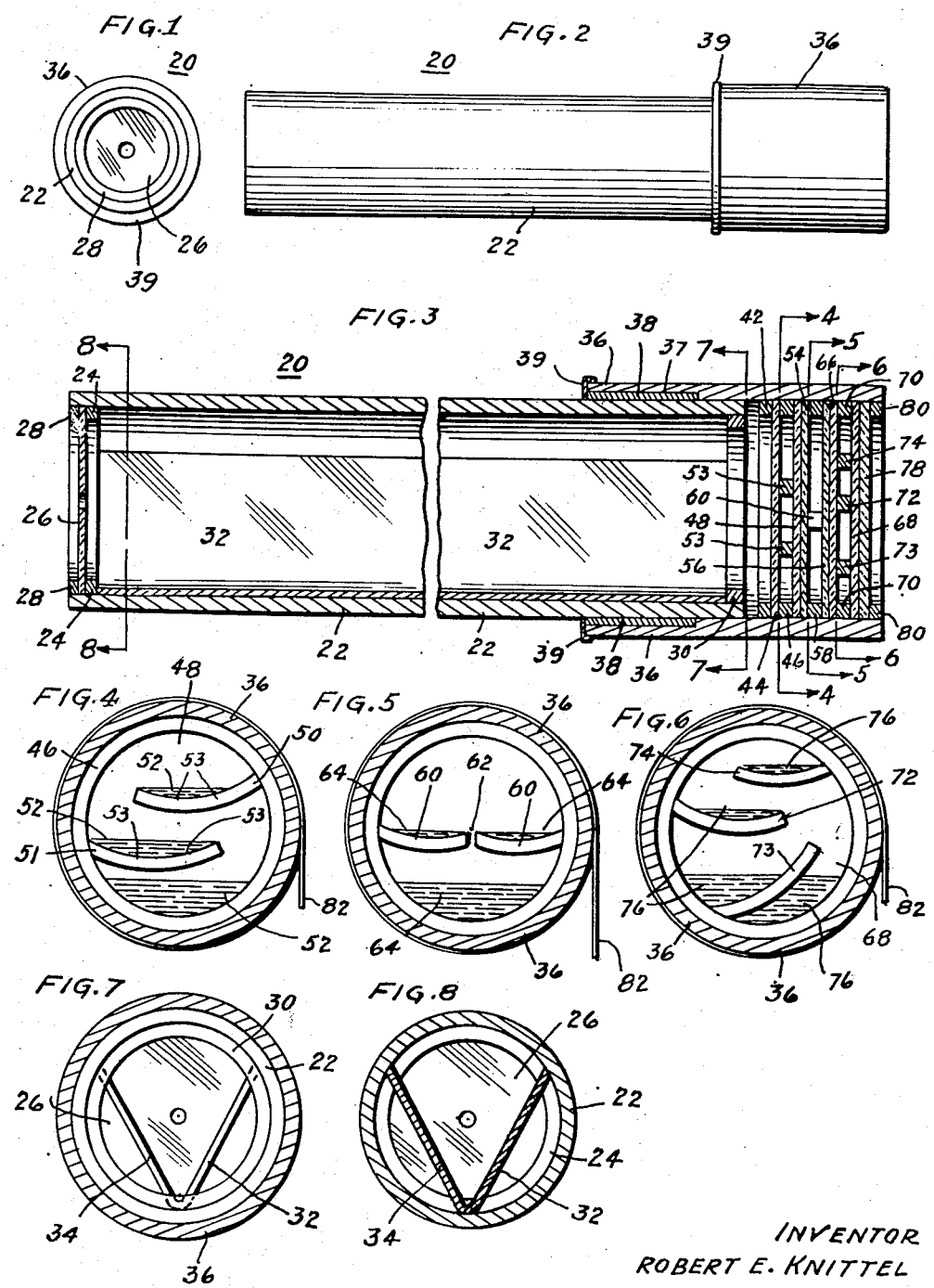
INVENTOR
ROBERT E. KNITTEL
BY Rey Eilers ATT'Y.

United States Patent Office 3,039,356
Patented June 19, 1962

3,039,356
KALEIDOSCOPES
Robert E. Knittel, St. Louis, Mo.
(1903 Spruce St., Murphysboro, Ill.)
Filed Nov. 4, 1959, Ser. No. 850,906
9 Claims. (Cl. 88—15)

This invention relates to improvements in kaleidoscopes. More particularly, this invention relates to improvements in the pattern-producing portions of kaleidoscopes.

It is therefore an object of the present invention to provide an improved pattern-producing portion for kaleidoscopes.

A typical commercially-available kaleidoscope produces patterns by disposing a number of translucent, differently-colored objects in a chamber that has a transparent wall and a translucent wall. The transparent wall is exposed to the eyepiece of the kaleidoscope, and two, inclined, reflecting surfaces extend between that transparent wall and that eyepiece. Rotation of that chamber causes the translucent, differently-colored objects to shift position relative to each other, and as they shift position they form symmetrical and changing patterns. In forming those patterns, the translucent, differently-colored objects please and delight the viewer.

However, the translucent, differently-colored objects tend to move in an abrupt and jerky manner as the chamber is rotated. Further, those translucent, differently-colored objects tend to form somewhat harsh patterns. It would be desirable to provide a kaleidoscope that forms patterns in a smooth and even manner. Further, it would be desirable to have that kaleidoscope form soft and attractive patterns. The present invention provides such a kaleidoscope; and it is therefore an object of the present invention to provide a kaleidoscope which forms soft and attractive patterns and which does so in a smooth and even manner.

The kaleidoscope provided by the present invention utilizes colored liquids to form the desired symmetrical and changing patterns. Those liquids are guided by baffles, and those liquids flow smoothly and evenly to form soft and attractive patterns of pleasing and delightful appearance. The colored liquids pass more light than do the translucent, differently-colored objects of the typical commercially-available kaleidoscope. Furthermore, the colored liquids coact with the baffles to provide patterns that resemble some patterns found in stained glass windows. The overall result is that an unusually delightful series of patterns can be provided by the kaleidoscope of the present invention. It is therefore an object of the present invention to provide a kaleidoscope wherein colored liquids and the baffles therefor form the patterns presented to view.

The liquids that are used in forming the patterns presented to the viewer are additionally desirable because those liquids can remain in motion for short periods of time after the rotation of the kaleidoscope has ceased. Moreover, air can be made to bubble up through the colored liquids, after the rotation of the kaleidoscope has ceased, and thereby provide still further variations in the patterns presented to the viewer. Also, draining openings can be provided in the baffles to permit the patterns to change still further as they are being viewed.

The colored liquids of the kaleidoscope are held within liquid-tight chambers, and those chambers are adjacent each other. Those chambers are mounted so they serially transmit light to the eye of the viewer; and, consequently, those chambers provide a real sensation of depth. This is in pleasing contrast to the flat sensation provided by the translucent, differently-colored objects in the typical commercially available kaleidoscope.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing, FIG. 1 is a view of that end of the kaleidoscope provided by the present invention which has the eyepiece, FIG. 2 is a side elevational view of the kaleidoscope of FIG. 1, FIG. 3 is a broken, longitudinal section, on an enlarged scale, through the kaleidoscope of FIGS. 1 and 2, FIG. 4 is a transverse section and it is taken along the plane indicated by the line 4—4 in FIG. 3, FIG. 5 is another transverse section and it is taken along the plane indicated by the line 5—5 in FIG. 3, FIG. 6 is still another transverse section and it is taken along the plane indicated by the line 6—6 in FIG. 3, FIG. 7 is a still further transverse section and it is taken along the plane indicated by the line 7—7 in FIG. 3, and FIG. 8 is yet another transverse section and it is taken along the plane indicated by the line 8—8 in FIG. 3.

Referring to the drawing in detail, the numeral 20 generally denotes a kaleidoscope that is made in accordance with the principles and teachings of the present invention. That kaleidoscope includes a cylindrical tube 22 which can be made of any light-weight but sturdy material. An annular pad 24 is fixedly disposed within the tube 22 adjacent the left-hand end of that tube, and that pad preferably is made from a resilient material. A disc 26 with an opening at the center thereof is telescoped within the left-hand end of the tube 22, and that disc abuts the left-hand face of the annular pad 24. The disc 26 serves as the eyepiece for the kaleidoscope 20. An annular ring 28 is disposed within the left-hand end of the tube 22 at the very end of that tube, and that ring abuts the left-hand face of the disc 26. The annular rings 24 and 28 act to fixedly hold the disc 26 in position within the tube 22.

The numeral 30 denotes another annular pad, and that pad is set adjacent the right-hand end of the tube 22. A mirror 32 is disposed within the tube 22 and a mirror 34 is also disposed within that tube; and those mirrors are set so they subtend an acute angle. The annular pads 24 are 30 hold the mirrors 32 and 34 against displacement longitudinally of the tube 22. The reflecting surfaces of the mirrors 32 and 34 confront each other in the manner in which the mirrors of kaleidoscopes customarily confront each other. If desired, the mirrors 32 and 34 could be made by bending a bright sheet of metal to define those mirrors.

The numeral 36 denotes a support of cylindrical configuration that is dimensioned to telescope over the right-hand end of the tube 22. That support is provided with an annular recess 37, and that annular recess extends to the left-hand end of that support. That recess telescopes over a sleeve 38 that is fixed to the exterior of the tube 22 adjacent the right-hand end of that tube. The engagement between the recess 37 and the sleeve 38 is loose enough to permit ready rotation of the support 36 relative to the tube 22. A confining ring 39 is crimped onto the left-hand end of the support 36; and that ring coacts with the sleeve 38 to prevent separation of the support 36 from the tube 22 while permitting ready rotation of that support relative to that tube.

The numeral 42 denotes an annular pad which is disposed within the support 36 at a point close to the longitudinal center of that support. That pad will be spaced to the right of the right-hand end of the tube 22 when the support 36 is telescoped over the right-hand end of that tube. The right-hand face of the pad 42 is abutted by a liquid-tight chamber which includes the transparent walls 44 and 48, the annular spacer 46 and the baffle plates 50 and 51. The spacer 46 holds the transparent walls 44 and 48 apart and coacts with them to make the chamber liquid-tight. A colored liquid 52 is held within and confined by the liquid-tight chamber; and that liquid will be guided and directed by the baffles 50 and 51. Where desired, the baffles 50 and 51 can be provided with very shallow notches that can coact with the wall 44 to define leaching holes 53.

Adjacent the first liquid-tight chamber is a second liquid-tight chamber which includes transparent walls 54 and 56, annular spacer 58 and baffle 60. That baffle has an opening 62 at the center thereof, and that second liquid-tight chamber contains colored liquid 64. Adjacent the second liquid-tight chamber is a third liquid-tight chamber; and that third liquid-tight chamber includes the transparent walls 66 and 68, the annular spacer 70, and the baffles 72, 73 and 74. Colored liquid 76 is enclosed within the third liquid-tight chamber. If desired, shallow notches could be provided in the baffles 72, 73 and 74 to form leaching holes.

The liquids 52, 64 and 76 are preferably different in color. Moreover, those liquids preferably are the primary colors of light.

A disc 78 of a light-diffusing material is disposed adjacent the right-hand end of the third liquid-tight chamber, and that disc will diffuse the light entering the right-hand end of the support 36. An annular pad 80 abuts the right-hand face of the disc 78, and that pad is disposed within, and immediately adjacent, the right-hand end of the support 36.

As indicated particularly by FIG. 4, the baffles 50 and 51 are arcuate; and those baffles project inwardly from the annular spacer 46. As indicated by FIG. 5, the baffle 60 can be considered as a continuous baffle with an opening 62 through it, or it can be considered as two arcuate baffles projecting inwardly from the annular spacer 58. As indicated by FIG. 6, the baffles 72, 73 and 74 are arcuate and extend inwardly from the spacer 70. The baffles 50, 51, 60, 72, 73 and 74 are preferably made of a material that is opaque or substantially so.

The three liquid-tight chambers are pressed into position within the support 36, and they will thus be held against accidental rotation relative to each other or relative to the support 36. As a result, when the support 36 is rotated relative to the tube 22, the three liquid-tight chambers will rotate with it.

The user will hold the kaleidoscope to his eye and look through the opening in the disc 26. In doing so, the user will see the patterns that are formed by the colored liquid 52, 64 and 76 and by the baffles 50, 51, 60, 72, 73 and 74. The user will see those patterns directly and will also see those patterns as they are reflected by the mirrors 32 and 34. Because the baffles 50, 51, 60, 72, 73 and 74 are opaque or substantially so, they will coact with the colored liquids 52, 64, and 76 to form patterns suggestive of patterns in stained glass windows.

As the user rotates the support 36, the liquids 52, 64 and 76 will tend to move toward those portions of the liquid-tight chambers which are then at the bottom of the support 36. In doing so, those liquids will provide a smooth flow of liquids that will be attractive to the user's eye and which will form symmetrical and pleasing patterns. Where the support 36 is rotated rapidly and then is halted quickly, the liquids will require a short period of time in which to seek their level; and during that period of time they will provide further delights for the user.

Where one or more of the baffles is provided with shallow recesses to define leaching holes, still further action is available to the user. After the colored liquids have nominally come to rest, they will leach through those notches and additionally change the patterns as they do so.

In using the kaleidoscope provided by the present invention, the user can hold the tube 22 stationary and rotate the support 36 or he can rotate the tube 22 and the support 36 as a unit. This is desirable because it enables the user to view two distinctively different kinds of changing patterns. Specifically, where the user holds the tube 22 stationary and rotates the support 36, both the baffles and the colored liquids will rotate relative to the field of view defined by the mirrors 32 and 34. As a result, there will be an infinite number of baffle-defined and color-defined patterns offered to the user's gaze. Where the user rotates the tube 22 and the support 36 as a unit, the baffles will remain stationary relative to the field of view defined by the mirrors 32 and 34 but the colored liquids will move relative to that field of view. As a result, there will be an infinite number of color-defined patterns offered to the gaze of the user.

The user can also vary the two distinctively different kinds of changing patterns by halting the rotation of the support 36 at different circumferentially-spaced positions relative to the tube 22. Thus, where the support 36 is to be rotated relative to the tube 22, a different pattern will be produced when that support is brought to a halt at each different, circumferentially-spaced positio relative to the field of view defined by the mirrors 32 and 34. This is particularly true because the colored liquids can remain in motion after the rotation of the support is halted, because air can bubble upwardly through those liquids, and because those liquids can work their way downwardly through leaching holes. Where the tube 22 and the support 36 are to be rotated as a unit, it is possible to vary the patterns by changing the initial position of the support 36 relative to the field of view defined by the mirrors 32 and 34 and then rotating that tube and support as a unit. It is possible to additionally vary those patterns by halting the rotation of that tube and support at different angular positions. Thus, the colored liquids will form two wholly different patterns where the tube and support are halted in positions which are spaced one hundred and eighty degrees apart.

The baffles in the various liquid-tight chambers variously distribute the different colored liquids across the field of view defined by the mirrors 32 and 34. Thus, those baffles will occasionally cause some portions of a pattern to be defined by just one or the other of the colored liquids 52, 64 or 76 while other portions of that pattern are defined by two of those liquids and still other portions of that pattern are defined by all three of those liquids. This means that a pattern can have one portion that is pure blue, pure red or pure yellow, can have another portion that is a composite of blue and red or blue and yellow or red and yellow, and can have still another portion that is a composite of blue, red and yellow. The resulting patterns consisting of primary, secondary and tertiary colors are exceedingly pleasing to the eye. Furthermore, as one or more of the colored liquids remains in motion, experiences bubbling, or experiences leaching, after rotation of the support 36 or rotation of tube 22 and support 36 has been halted, the patterns will change in color as well as in configuration and provide still further interest.

The overall result is that the kaleidoscope of the present invention provides the user with a far greater number and variety of patterns than any other kaleidoscope could provide. Further, the kaleidoscope of the present invention provides patterns which have greater depth than the patterns which any other kaleidoscope could provide. Moreover the kaleidoscope of the present invention provides patterns that are softer and more attractive than the patterns any other kaleidoscope could provide.

If desired, the baffles could be made straight in part but bent to subtend angles. The primary requirement of the baffles is that they form liquid-holding pockets that successively pick up and spill liquid as the support 36 is rotated.

The opening 62 is made narrow enough to cause bubbles of air to form as liquid passes down through that opening. That opening can be made narrow enough to cause the bubbling to be prolonged, thereby providing a prolonged and pleasing pattern to the user. Further, if desired, a wetting agent could be added to the liquid 64 to facilitate the formation of bubbles.

If desired, the support 36 could be rotated rapidly relative to the tube 22 while the user was looking through that tube. Such rotation could be effected by a spring drive or a track and gear arrangement, but it is most easily and simply effected by affixing a string 82 to the support 36, winding that string around that support, and then pulling on that string. Specifically, where the string 82 is wound around the support 36 in the form of a helix and is then pulled, the support 36 will rotate rapidly relative to the tube 22; and that rotation will provide a color effect which is similar to that of a pin wheel. The color effect is another of the many and pleasing effects which the kaleidoscope of the present invention offers to the user.

Whereas the drawing and accompanying description have shown and described a preferred embodiment of the present invention it should be apparent to those skilled in the art that various changes may be made in the form of the invention without affecting the scope thereof.

What I claim:

1. In a kaleidoscope, a tube that contains mirrors which subtend a dihedral angle, a support rotatably mounted on one end of said tube, a liquid-tight chamber mounted within said support and normally held immovable relative to said support, an opaque arcuate liquid-directing baffle disposed within said liquid-tight chamber, and disposable within the sight area defined by said mirrors, said baffle defining a passage for liquid, a colored liquid in said liquid-tight chamber, said liquid-directing baffle being adapted to hold some of said colored liquid above and away from that portion of said colored liquid which is adjacent the bottom of said liquid-tight chamber and to hold said some of said colored liquid in said sight area defined by said mirrors, a second liquid-tight chamber mounted within said support and normally held immovable relative to said support, a second opaque arcuate liquid-directing baffle disposed within said second liquid-tight chamber, and disposable within the sight area defined by said mirrors, said second baffle defining a second passage for liquid, a second colored liquid in said second liquid-tight chamber, said second liquid-directing baffle being adapted to hold some of said second colored liquid above and away from that portion of said second colored liquid which is adjacent the bottom of said second liquid-tight chamber and to hold said some of said second colored liquid in said sight area defined by said mirrors, said second colored liquid having a color different from the color of the first said colored liquid, said liquid-tight chambers being adjacent each other and serially transmitting light to said tube, and a flexible element that can be wound around said support and pulled to rotate said support relative to said tube, whereby said support can be rotated rapidly relative to said tube while said tube is being held up to the viewer's eye.

2. In a kaleidoscope, a tube that contains mirrors which subtend a dihedral angle, a support rotatably mounted on one end of said tube, a liquid-tight chamber mounted within said support and normally held immovable relative to said support, an arcuate liquid-directing baffle disposed within said liquid-tight chamber and disposable within the sight area defined by said mirrors, a colored liquid in said liquid-tight chamber, a second liquid-tight chamber mounted within said support and normally held immovable relative to said support, a second arcuate liquid-directing baffle disposed within said second liquid-tight chamber, and disposable within the sight area defined by said mirrors, a second colored liquid in said second liquid-tight chamber, said second colored liquid having a color different from the color of the first said colored liquid, said liquid-tight chambers being adjacent each other and serially transmitting light to said tube, and a flexible element that can be wound around said support and pulled to rotate said support relative to said tube, whereby said support can be rotated rapidly relative to said tube while said tube is being held up to the viewer's eye.

3. In a kaleidoscope, a tube that contains mirrors which subtend a diheral angle, a support rotatably mounted on one end of said tube, a liquid-tight chamber mounted within said support, a liquid-directing baffle disposed within said liquid-tight chamber, and disposable within the sight area defined by said mirrors, a colored liquid in said liquid-tight chamber, said liquid-directing baffle being adapted to hold some of said colored liquid above and away from that portion of said colored liquid which is adjacent the bottom of said liquid-tight chamber and to hold said some of said colored liquid in said sight area defined by said mirrors, a second liquid-tight chamber mounted within said support, a second liquid-directing baffle disposed within said second liquid-tight chamber, and disposable within the sight area defined by said mirrors, a second colored liquid in said second liquid-tight chamber, said second liquid-directing baffle being adapted to hold some of said second colored liquid above and away from that portion of said second colored liquid which is adjacent the bottom of said second liquid-tight chamber and to hold said some of said colored liquid in said sight area defined by said mirrors, said second colored liquid having a color different from the color of the first said colored liquid, said liquid-tight chambers being adjacent each other and serially transmitting light to said tube, and a flexible element that can be wound around said support and pulled to rotate said support relative to said tube, whereby said support can be rotated rapidly relative to said tube while said tube is being held up to the viewer's eye.

4. In a kaleidoscope, a tube that contains mirrors which subtend a diheral angle, a support rotatably mounted on one end of said tube, a liquid-tight chamber mounted within said support, a liquid-directing baffle disposed within said liquid-tight chamber and disposable within the sight area defined by said mirrors, a colored liquid in said liquid-tight chamber, said liquid-directing baffle being adapted to hold some of said colored liquid above and away from that portion of said colored liquid which is adjacent the bottom of said liquid-tight chamber and to hold said some of said colored liquid in said sight area defined by said mirrors, a second liquid-tight chamber mounted within said support, a second liquid-directing baffle disposed within said second liquid-tight chamber and disposable within the sight area defined by said mirrors, and a second colored liquid in said second liquid-tight chamber, said second colored liquid having a color different from the color of the first said colored liquid, said second liquid-directing baffle being adapted to hold some of said second colored liquid above and away from that portion of said second colored liquid which is adjacent the bottom of said second liquid-tight chamber and to hold said some of said second colored liquid in said sight area defined by said mirrors, said liquid-tight chambers serially transmitting light to said tube, said tube and said support being rotatable as a unit to provide a number of individually different color-defined patterns, said support being rotatable relative to said tube to provide a number of individually different baffle-defined and color-defined patterns.

5. In a kaleidoscope, a tube that contains mirrors which subtend a dihedral angle, a support rotatably mounted on one end of said tube, a liquid-tight chamber mounted within said support, a liquid-directing baffle disposed within said liquid-tight chamber and disposable within the sight area defined by said mirrors, a colored liquid in said liquid-tight chamber, said liquid-directing baffle being adapted to hold some of said colored liquid above and away from that portion of said colored liquid which is adjacent the bottom of said liquid-tight chamber and to hold some of said colored liquid in said sight area defined by said mirrors, a second liquid-tight chamber mounted within said support, a second liquid-directing baffle disposed within said second liquid-tight chamber and disposable within the sight area defined by said mirrors, and a second colored liquid in said second liquid-tight chamber, said second liquid-directing baffle being adapted to hold some of said second colored liquid above and away from that portion of said second colored liquid which is adjacent the bottom of said second liquid-tight chamber and to hold said some of said second colored liquid in said sight area defined by said mirrors, said second colored liquid having a color different from the color of the first said colored liquid, said liquid-tight chambers serially transmitting light to said tube, said support being rotatable relative to said tube to provide a number of individually different baffle-defined and color-defined patterns, said baffles having a lower degree of light transmissibility than said liquids whereby said baffles coact with said liquids to provide patterns comparable to those in stained glass windows.

6. In a kaleidoscope, a liquid-tight chamber and disposable within the sight of the viewer, a liquid-directing baffle disposed within said liquid-tight chamber, a colored liquid in said liquid-tight chamber, a second liquid-tight chamber, a second liquid-directing baffle disposed within said second liquid-tight chamber and disposable within the sight of the viewer, and a second colored liquid in said second liquid-tight chamber, said second colored liquid having a color different from the color of the first said colored liquid, said liquid-tight chambers being mounted one behind the other to provide depth for the patterns formed within said kaleidoscope and to permit said patterns to be formed of primary or secondary colors, said liquid-directing baffle in the first said liquid-tight chamber defining a passage for the colored liquid in said chamber, said second liquid-directing baffle in said second liquid-tight chamber defining a second passage for said second colored liquid, the first said liquid-directing baffle and said second liquid-directing baffle being spaced laterally from each other, the first said passage and said second passage being spaced laterally from each other.

7. In a kaleidoscope, a tube that contains mirrors which subtend a dihedral angle, a liquid-tight chamber, a liquid-directing baffle disposed within said liquid-tight chamber and disposable within the sight area defined by said mirrors, a colored liquid in said liquid-tight chamber that can be directed by said baffle, said liquid-directing baffle being adapted to hold some of said colored liquid above and away from that portion of said colored liquid which is adjacent the bottom of said liquid-tight chamber and to hold said some of said colored liquid in said sight area defined by said mirrors, a second liquid-tight chamber, a second liquid-directing baffle disposed within said second liquid-tight chamber and disposable within said sight area defined by said mirrors, and a second colored liquid in said second liquid-tight chamber that can be directed by said second liquid-directing baffle, said second liquid-directing baffle being adapted to hold some of said second colored liquid above and away from that portion of said second colored liquid which is adjacent the bottom of said second liquid-tight chamber and to hold said some of said second colored liquid in said sight area defined by said mirrors, said second colored liquid having a color different from the color of the first said colored liquid, said liquid-tight chambers being mounted one behind the other to provide depth for the patterns formed within said kaleidoscope and to permit said patterns to be formed of primary or secondary colors, the first said liquid-directing baffle and said second liquid-directing baffle being adapted to be spaced laterally from each other.

8. A kaleidoscope comprising a tube that contains mirrors which are set at an angle to each other to define a sight area, an eye-piece at one end of said tube and a support mounted at the other end of said tube, said support and said eye-piece being relatively rotatable, a plurality of liquid-tight chambers mounted in said support for rotation therewith, each of said chambers having mounted therein a baffle having a portion thereof extending into the sight area, said baffle having a depressed portion in said sight area which forms a liquid-receiving pocket, and a differently-colored liquid in each chamber filling less than one half of said chamber, the baffle in one chamber being offset with respect to the baffle in a second chamber.

9. A kaleidoscope comprising a tube that contains mirrors which are set at an angle to each other to define a sight area, an eye-piece at one end of said tube and a support mounted at the other end of said tube, said support and said eye-piece being relatively rotatable, a plurality of liquid-tight chambers mounted in said support for rotation therewith, each of said chambers having mounted therein a baffle having a portion thereof extending into the sight area, said baffle having a depressed portion in said sight area which forms a liquid-receiving pocket, and a differently-colored liquid in each chamber filling less than one half of said chamber, the baffle in one chamber being offset with respect to the baffle in a second chamber, some of said depressed portions of said baffles having openings therein whereby the liquid held by said some depressed portions can pass downwardly from said depressed portions while in said sight area.

References Cited in the file of this patent
UNITED STATES PATENTS
877,645    Hare _____ Jan. 28, 1908
FOREIGN PATENTS
8,909    Great Britain _____ of 1893